United States Patent [19]

King

[11] 4,285,495
[45] Aug. 25, 1981

[54] SAFETY VALVE

[76] Inventor: Ottis W. King, 8534 E. 24th, Tulsa, Okla. 74127

[21] Appl. No.: 135,498

[22] Filed: Mar. 31, 1980

Related U.S. Application Data

[63] Continuation of Ser. No. 860,700, Dec. 12, 1977, abandoned.

[51] Int. Cl.³ .......................................... F16K 31/122
[52] U.S. Cl. .................................... 251/63.5; 137/219
[58] Field of Search ................ 251/62, 63, 63.4, 63.5, 251/63.6, 324; 137/219

[56] References Cited

U.S. PATENT DOCUMENTS

| | | | |
|---|---|---|---|
| 2,725,891 | 12/1955 | De Bourguignon et al. | 137/219 |
| 2,759,699 | 8/1956 | Rush | 251/63.5 |
| 3,086,745 | 4/1963 | Natho | 251/62 |
| 3,260,275 | 7/1966 | Armstrong et al. | 251/63 |
| 3,518,032 | 6/1970 | De Groff et al. | 251/62 |
| 3,650,289 | 3/1972 | Locke | 137/219 |
| 4,026,327 | 5/1977 | Deinlein-Kalb | 137/219 |

FOREIGN PATENT DOCUMENTS

| | | | |
|---|---|---|---|
| 512895 | 2/1955 | Italy | 137/219 |
| 440889 | 1/1968 | Switzerland | 137/219 |

Primary Examiner—Martin P. Schwadron
Assistant Examiner—George L. Walton

Attorney, Agent, or Firm—Head & Johnson

[57] ABSTRACT

A safety valve having an upright tubular body with an axial opening therethrough, a portion of the opening at the lower end forming a flow passageway, the body having outlet ports extending from the flow passageway to the external cylindrical surface, an end cap closing the upper end of the axial opening, an internal stem guide within the axial opening separating the lower flow passageway from an upper cylinder and having a reduced diameter axial opening, a plunger reciprocally positioned within the flow passageway, the plunger having an upwardly extending axial stem received in the stem guide and the plunger having a seaing surface on the lower end, a seating surface within the flow passageway between the inlet ports and the open lower end of the passageway, the seating surface being engaged by the plunger sealing surface when the plunger is in the downward, valve closed, position, a piston positioned in the upper cylinder, the piston being affixed to the upper end of the plunger stem, the body having a small diameter passageway communicating between the body exterior and the cylinder above the stem guide so that fluid pressure may be applied to the small passageway to force the piston and thereby the plunger into an upper, valve open, position, and a spring normally urging the plunger into the downward, valve closed, position, so that loss of actuating fluid will cause the valve to automatically close.

5 Claims, 6 Drawing Figures

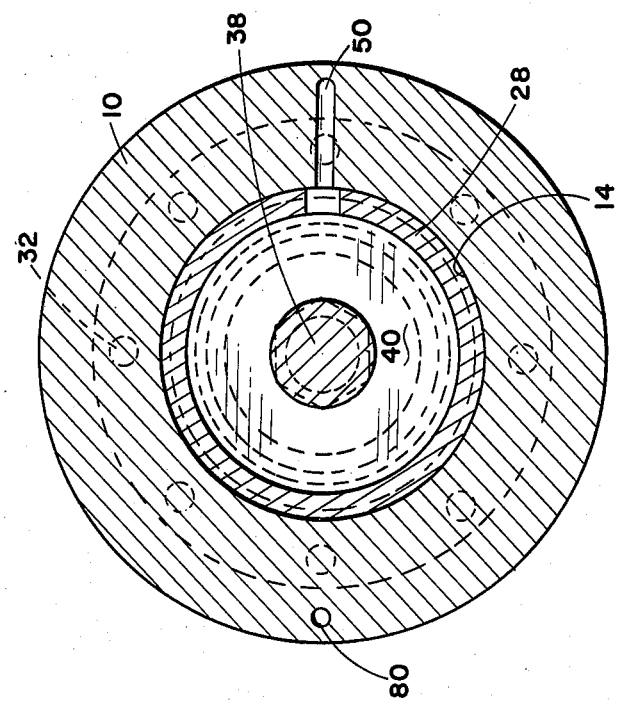
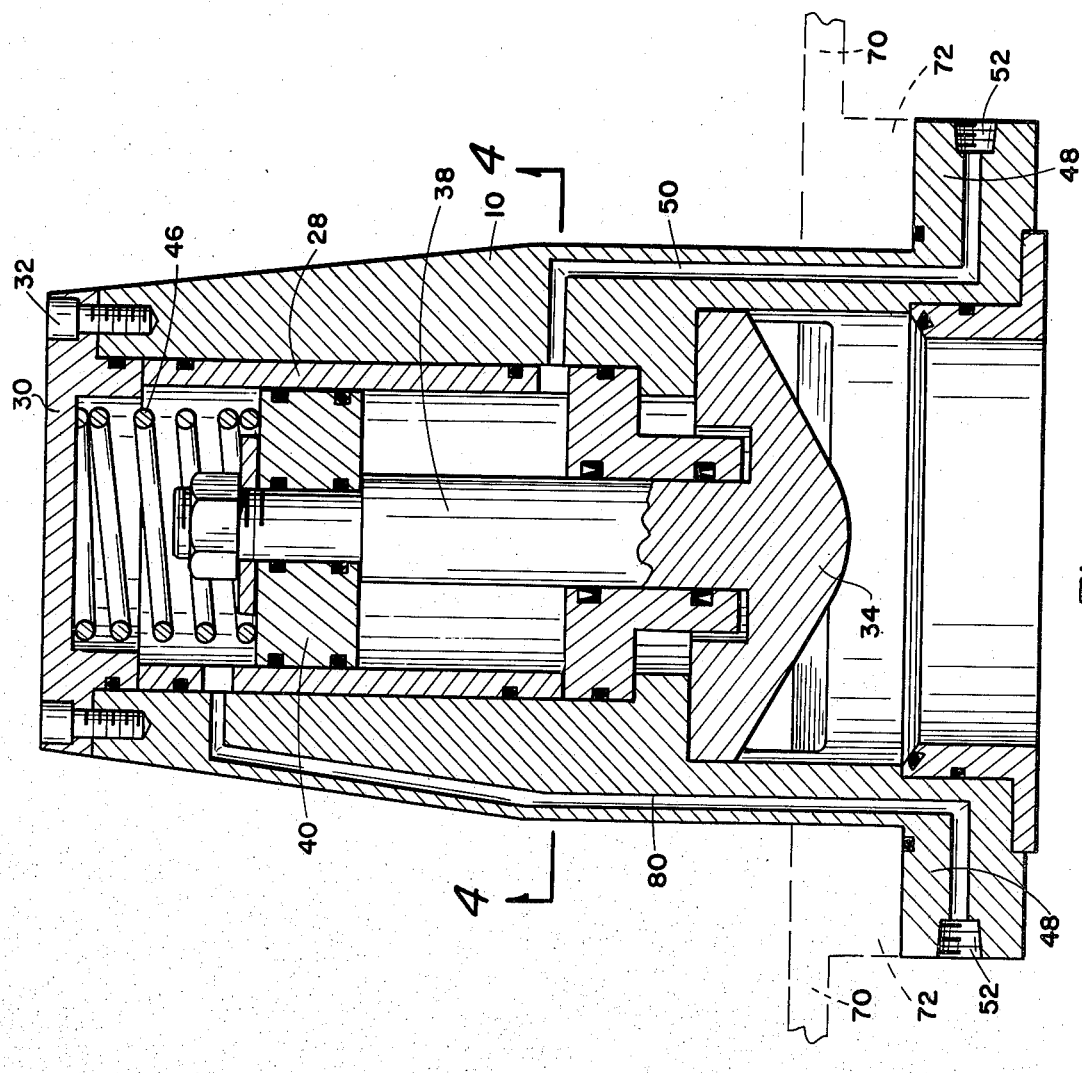
Fig. 4
Fig. 3

SAFETY VALVE

This is a continuation application of Ser. No. 860,700, filed Dec. 12, 1977 now abandoned.

BACKGROUND AND OBJECTS OF THE INVENTION

In many types of fluid handling conditions it is highly important that means be provided for closing fluid flow in the event of an emergency. Valves exist on the market today which can be manually or mechanically closed upon demand; however, most require an externally supplied operating force to move the valve from the open to closed position. In many emergency situations the externally applied operating force may be impaired. An example of flow conditions which require the use of a safety valve is that of loading and unloading tanks, including the holds of tankers or barges, used for transporting petroleum products. During filling or delivery operations, if the line breaks, the vessel overflows, or if there is a fire, explosion, or other circumstance, it is important that means be provided for immediately closing fluid flow lines without depending upon the availability of an externally supplied motivating force.

The present invention is directed towards a valve of the type which, in one embodiment, is normally closed and which, in the absence of externally supplied motivating force, remains closed or, if opened, immediately moves to the closed position. The valve to be described herein includes an arrangement wherein it is normally closed against fluid flow. In order to open the valve, a positive fluid pressure must be applied to the valve. The valve will remain open as long as this externally supplied fluid pressure is available. In the event of an emergency, this externally supplied fluid pressure may be removed by automatic means, or in the event of an explosion, fire, or other catastrophe which destroys operating controls, the removal of the externally supplied hydraulic pressure will cause the valve to close. In other words, the valve is fail-safe and is closed at all times except in the presence of a positively supplied actuating fluid pressure signal to maintain the valve in an open position.

It is therefore an object of this invention to provide an improved safety valve. More particularly, an object of this invention is to provide an improved safety valve which provides automatic, fool-proof, and quick-acting shut-off of fluid flow, the valve being arranged in a manner to immediately move to the closed position and maintain a closed position in the absence of an externally supplied actuating fluid pressure signal.

These general objects, as well as other and more specific objects of the invention, will be fulfilled in the following description and claims, taken in conjunction with the attached drawings.

DESCRIPTION OF THE VIEWS

In FIG. 1 the valve is shown with an actuating signal applied so that the valve is in the open position.

FIG. 3 is a cross-sectional view as in FIG. 1 showing the valve mounted for use within a tank or vessel and showing an embodiment wherein the valve may be closed by application of an hydraulic fluid pressure closing signal.

FIG. 4 is a cross-sectional view taken along the line 4—4 of FIG. 1.

SUMMARY OF THE INVENTION

An improved safety valve is described which provides automatic, quick-acting shut-off of product flow in tanks and lines. The valve is formed of an upright, tubular body having an axial passageway therethrough. The lower portion of the axial passageway provides a flow passageway. The valve body has inlet ports communicating between the flow passageway and the exterior, the inlet ports being spaced above the open bottom end of the valve body. A valve seat is positioned in the flow passageway. A plunger is reciprocally positioned within the flow passageway and movable between a downward position wherein the plunger seats against the valve seat and closes the valve, and an upward position wherein the plunger is above the inlet ports. The plunger has an upwardly extending reduced diameter axial stem. The valve body includes a stem guide in the axial opening providing a reduced diameter opening which reciprocally and sealably receives the plunger stem. The upper portion of the axial opening in the valve body forms a cylinder. A piston is received in the cylinder and is affixed to the upper end of the valve stem. An end cap closes the upper end of the valve body. A spring is compressibly positioned between the end cap and the piston to normally force the piston and thereby the plunger to the downward position so that the valve sealing surface engages the valve seat to maintain the valve in a closed position. A small diameter fluid passageway is provided in the valve body between the exterior of the body and the cylinder above the stem guide whereby a hydraulic fluid pressure signal may be applied to the cylinder below the piston to raise the piston and thereby the plunger to open the valve and to maintain the valve in the open position so long as the positively applied pressure signal exists, but which allows the valve to immediately return to the closed position in the absence of the positively applied pressure signal.

DETAILED DESCRIPTION OF THE PREFERRED EMBODIMENT

Figure 2:
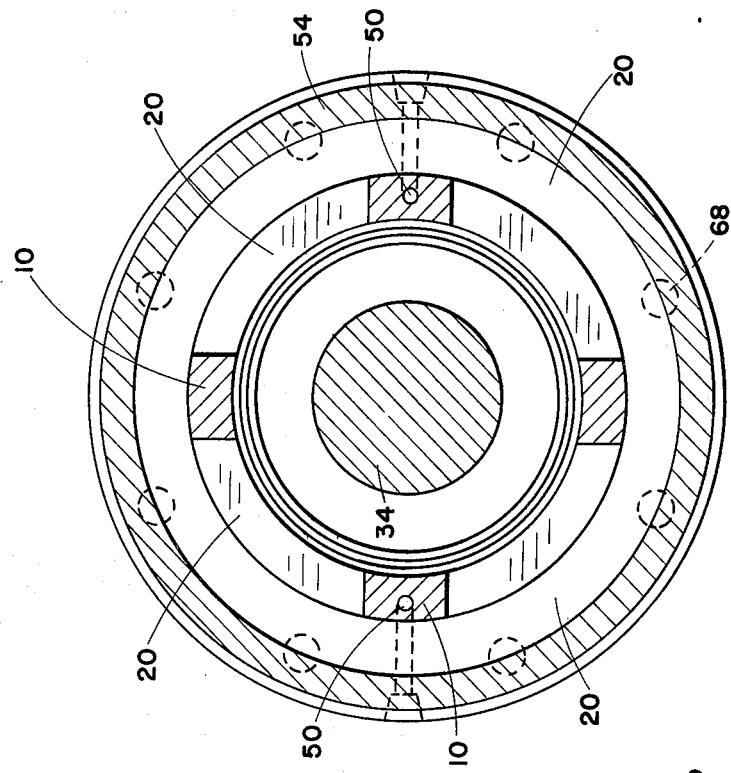
FIG. 2 is a cross-sectional view taken along the line 2—2 of FIG. 1.

Referring to the drawings, and first to FIGS. 1 and 2, the valve is formed of a cylindrical housing 10 which is illustrated and will be described as being vertically or upwardly positioned for purposes of explanation only. It is understood the valve may be oriented in any direction. Describing and claiming the valve in vertical orientation is for clarity only. The valve body has an axial opening therethrough defined in two parts; that is, a lower flow passageway 12, and an upper cylinder 14. Positioned within the lower flow passageway 12 is a seat element 16 providing a valve seating surface 18. In the illustrated arrangement the seat element 16 is shown as a separate and removable item although it can be seen that the seating surface 18 could be integrally formed as part of the flow passageway 12.

Communicating between the exterior of the body 10 and flow passageway 12 are four inlet ports 20.

The body axial opening includes a reduced diameter internal shoulder 22 which divides the upper cylinder 14 from the lower flow passageway 12. Received within cylinder 14 is a stem guide 24 which abuts with the internal shoulder 32. The stem guide 24 includes an axial stem opening 26.

A tubular sleeve 28 is also positioned within cylinder 14, the lower end of sleeve 28 engaging stem guide 24. The upper end of body 10 is closed with an end cap 30 which engages the upper end of sleeve 28, the end cap being held to the body by means of bolts 32.

Reciprocally positioned within the flow passageway 12 is a plunger 34 having a lower sealing surface 36. When the plunger is in the upward position as shown in FIG. 1, fluid is free to flow through the inlet ports 20, through the valve seat 18, and out the lower end of flow passageway 12. Thus the lower open end of the flow passageway 12 forms an outlet port.

Integrally affixed to plunger 34 is an axial upwardly extending stem 38 which is reciprocally and sealably received in stem guide opening 26. Affixed to the upper end of stem 38 is a piston 40. An opening 42 in the piston receives a reduced diameter portion 38A of the stem and by means of a nut 44 attached to the upper threaded end of the stem reduced diameter portion, the stem is secured to piston 40. The external diameter of the piston 40 is dimensioned to sealably engage the internal surface of sleeve 28.

A compression spring 46 is positioned between the lower surface of end cap 30 and the upper surface of piston 42 so that the piston and thereby the plunger 34 is normally urged into the downward, valve closed position.

The valve body 10 includes an integral lower enlarged diameter flange portion 48. Formed in the valve body is a small diameter passageway 50 which communicates the exterior of the valve body with the interior of the cylinder formed by the sleeve 28. In the illustrated arrangement, the small diameter passageway 50 extends from the outer cylindrical surface of the body flange 48 and is provided with a threaded portion 52 by which a small diameter line may be attached to the valve as a means of providing an operating pressure signal.

Surrounding the valve body 10 is a tubular housing 54. The housing 54 has an internal dimension to receive the valve body 10 and provide an annular flow space 56 therearound. The upper end of housing 54 includes an integral flange 58 by which a flow line flange 60 may be attached. The lower end of the housing 54 includes an attachment portion 62 having threaded openings 64 by which the housing may be secured to the body flange 48. A line flange 66 is shown attached to the valve body lower end by means of bolts 68 illustrating the manner in which the valve may be used for in-line application.

Figure 1:
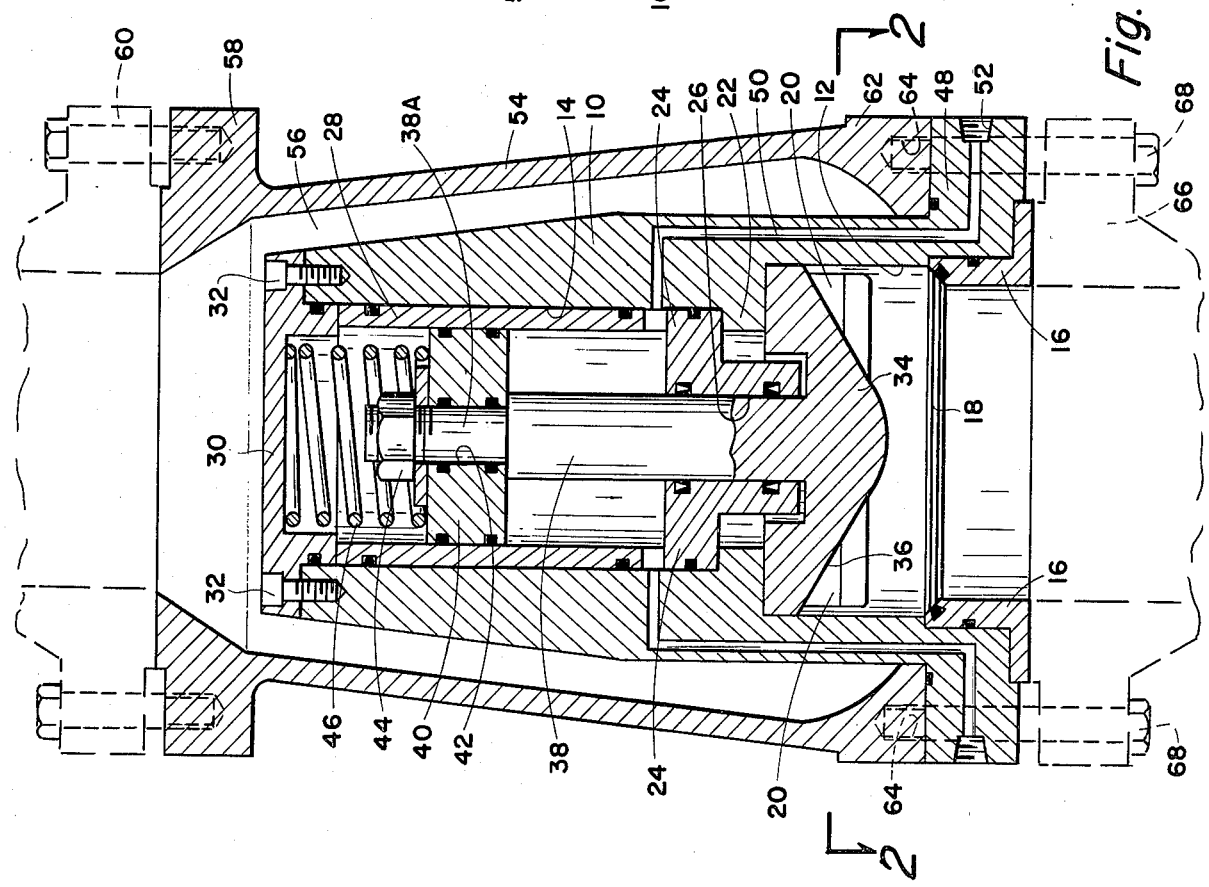
FIG. 1 is a cross-sectional view of an embodiment of the valve of this invention showing a housing so that the valve may be employed in a flow line.
Figure 5:
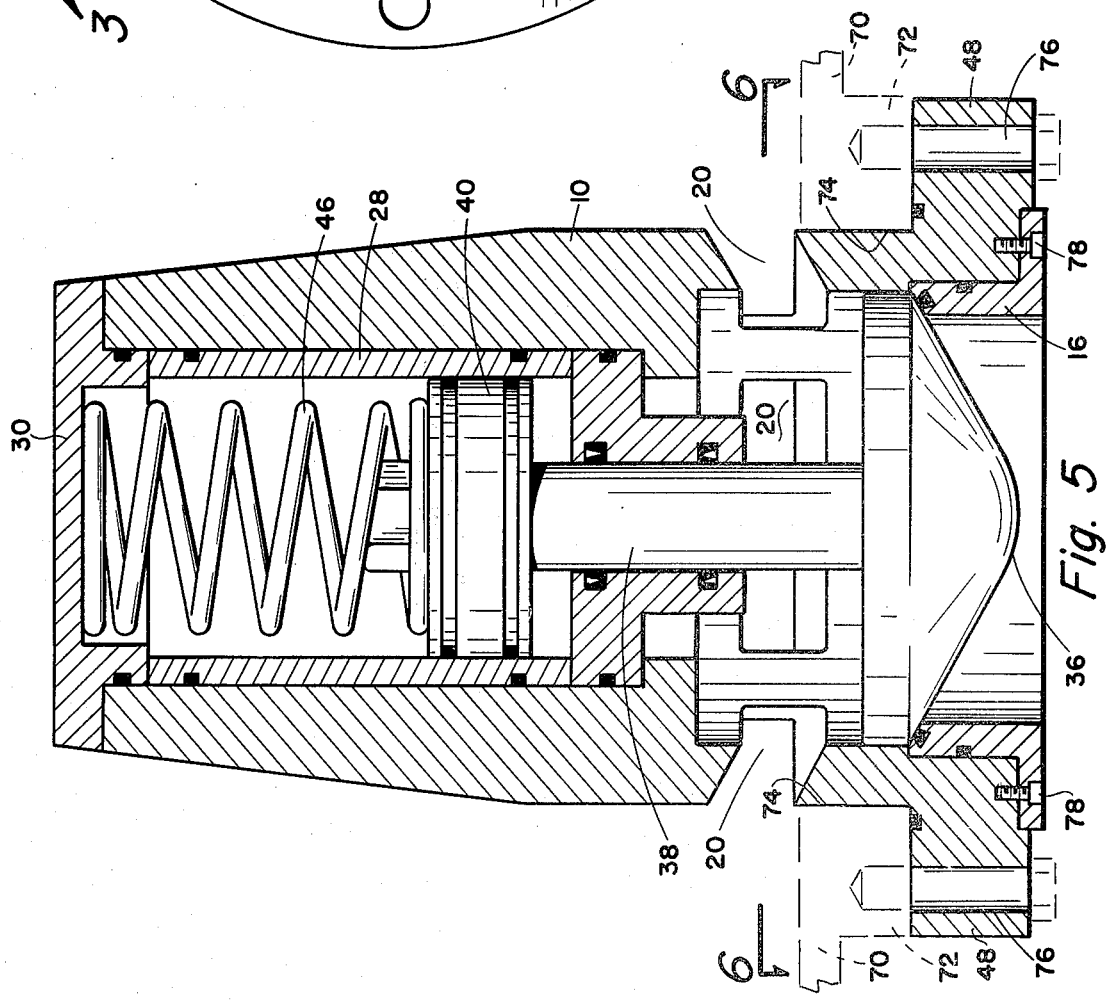
FIG. 5 is a cross-sectional view as in FIG. 3; that is, with the valve mounted within a tank or vessel, with the cross-sectional view of FIG. 5 being taken at approximately 45° to the plane of FIG. 3.

FIGS. 3 and 5 illustrate cross-sectional views of the valve showing means whereby it is utilized within the interior of a vessel rather than within housing 54 as in FIG. 1. In the arrangement of FIGS. 3 and 5 the valve is shown as mounted in the interior of a vessel 70. The vessel has an external flange 72 with opening 74 therein. The lower external portion of valve body 10 is received in the flange opening 74 and the valve body flange portion 48 is secured to the tank flange 72 by means of bolts 76.

Figure 6:
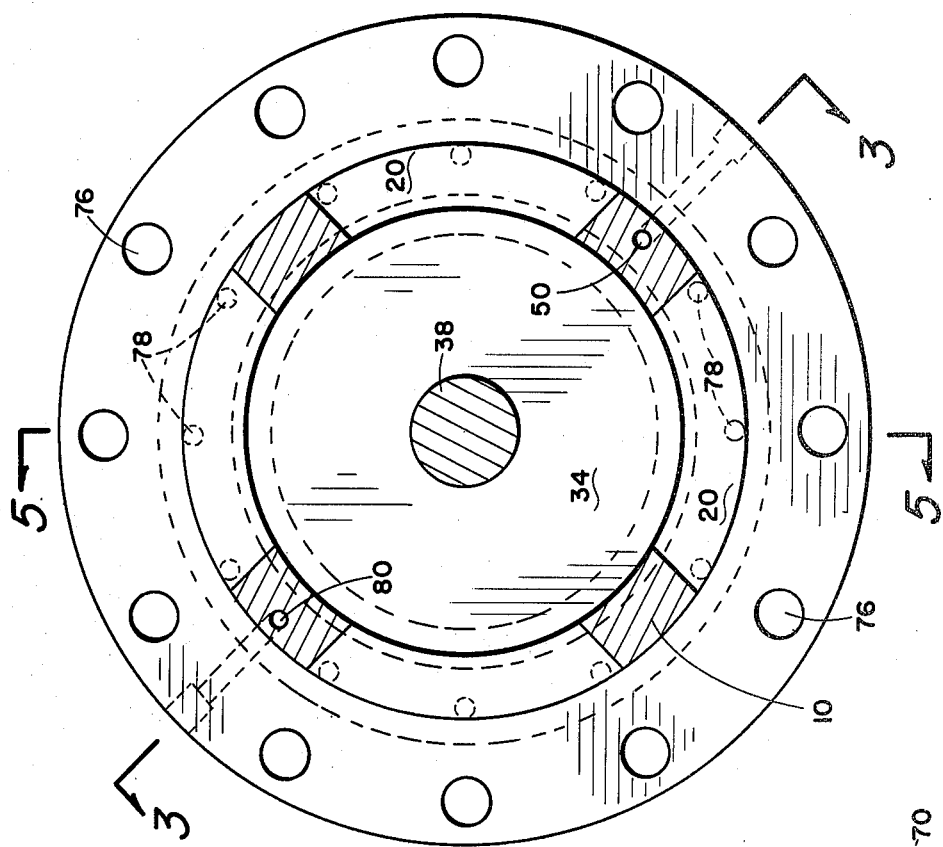
FIG. 6 is a cross-sectional view taken along the line 6—6 of FIG. 5.

FIGS. 3 and 5 are taken at vertical planes displaced 45° from each other as shown in the cross-sectional view of FIG. 6.

When an in-line flange 66 is used as in FIG. 1 to attach the valve for in-line use, the flange 66 may be used to retain the valve seat element 16 in position. When the valve is mounted for in-tank application as in FIGS. 3 and 5, the seat is held in position by means of bolts 78.

FIG. 3 shows an alternate arrangement in which there is a second small diameter passageway 80 which extends from the exterior of the valve body to the cylinder formed by the inner cylindrical surface of sleeve 28. The passageway communicates with the interior of the sleeve above the point of maximum upward travel of piston 40. With the provision of the small-diameter passageways 50 and 80, the valve may be operated in a double-action arrangement wherein a hydraulic fluid signal pressure may be applied to force piston 40 downwardly and thereby plunger 34 to the closed position.

OPERATION OF THE VALVE

Due to the compressive force of spring 46, the valve plunger 34 is normally maintained in the downward position wherein the plunger sealing surface 36 engages seating surface 18 to close the valve. In this mode no fluid flow can take place between the inlet ports 20 and the lower end of the fluid passageway 12. When it is desired to open the valve, a fluid pressure signal is applied to the small diameter passageway 50. This hydraulic pressure signal is conveyed to the lower surface of piston 40, moving it upwardly when the hydraulic force overcomes the compressive force of spring 46. This moves the plunger 34 upwardly, opening flow communication with the inlet ports 20. This flow communication is maintained only as long as there is a hydraulic pressure signal applied to passageway 50 sufficient to overcome the force of spring 46. If, for any reason, this pressure signal is removed, the valve returns to the closed position. Thereby, the valve is fail-safe in that it requires a positive applied pressure signal to open and to maintain the valve open. Any accident which destroys the availability of the opening pressure signal will cause the valve to return to the closed position. The valve works in the same way whether it is mounted within housing 54 for in-line operation, as illustrated in FIG. 1, or if the valve is mounted within the interior of a vessel as shown in FIGS. 3 and 5.

In the alternate arrangement of FIG. 3 in which an additional fluid passageway 80 is provided, the valve plunger can be forced closed by the means of a second hydraulic fluid pressure. This may be utilized in a control arrangement to supplement the compressive force of spring 46.

An important characteristic of the valve described herein is that it can easily be constructed to be full opening, that is, the area of all flow paths is equal to or greater than that of the connecting piping. The total area of inlet passages 20 is at least equal the internal area of seat 16 which, in turn, is equal to the piping to which the valve is connected. When arranged for in-line operation as in FIG. 1, the minimum cross-sectional area of annular space 56 is equal to or greater than the area of seat 16. Thus, the valve imposes no restriction on the flow of fluid therethrough.

As used herein, "fluid" means hydraulic or pneumatic pressure. The valve functions equally as well whether the piston 40 is operated on by a gas or a liquid.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A safety valve comprising:

an upright tubular body having an axial opening therethrough, a portion of the opening at the lower end forming a flow passageway communicating with the lower end and forming an outlet port, the body having inlet ports spaced above the lower end communicating between the flow passageway and the body exterior surface, said inlet ports comprised of a plurality of spaced openings in a common plane, the upper portion of the axial opening forming a cylinder, the body having an internal cylindrical shoulder in the axial opening dividing the lower flow passageway from the upper cylinder;

an end cap closing the upper portion of the body axial opening;

a cylindrical internal stem guide member removably positioned within said axial opening separating said lower flow passageway and said upper cylinder, and having a reduced diameter axial opening therein;

a tubular sleeve received in said cylinder portion of said body axial opening, the lower end of the sleeve engaging said stem guide member and the upper end of said sleeve engaging said end cap whereby said sleeve and stem guide are held in place between said internal shoulder and said end cap;

a plunger including a valve means reciprocally supported within said flow passageway, the plunger having an upwardly extending axial stem reciprocally and sealably received in said stem guide member axial opening, the plunger having a sealing surface thereon said valve means provides a recess for receiving a portion of said stem guide when the valve means is in the fully open position;

a seating surface within and partially defining said flow passageway, the seating surface being between said inlet port and said lower end outlet port, the valve being closed when said plunger sealing surface engages the seating surface;

a piston reciprocally positioned in said upper sleeve, the piston being affixed to the upper end of said plunger stem;

a spring compressibly positioned within said sleeve between said piston and said end cap to urge said plunger towards the closed position;

and said body having a small diameter passageway communicating between the body exterior and said cylinder above said stem guide means whereby fluid pressure may be supplied through the small passageway to force said piston and thereby said plunger upwardly to open the valve means.

2. A safety valve according to claim 1 including a second small diameter passageway communicating between the valve body exterior and the cylinder above the point of maximum upward travel of said pistion whereby fluid pressure may be supplied through the second small diameter passageway to force said piston and thereby said plunger downward to the valve closed position.

3. A safety valve according to claim 1 including a tubular valve seat member telescopically and removeably received in the lower end of said body flow passageway, the upper end of said seat member being configured to form said valve seating surface.

4. A safety valve according to claim 1 wherein said body includes an integral enlarged diameter external flange at the lower end thereof below said outlet ports, said small diameter passageway being in part received in the flange, and including;

a tubular valve housing receiving said valve body above said flange, the lower end of said housing being sealably secured to said flange, the internal diameter of the housing being larger than the external diameter of the body above the flange providing an annular flow area communicating with said inlet port the upper end of the housing having means for attachment to other fluid carrying means.

5. A safety valve comprising:

an upright tubular body having an axial opening therethrough, a portion of the opening at the lower end forming a flow passageway communicating with the lower end and forming an outlet port, the body having at least one inlet port spaced above the lower end and communicating between the flow passageway and the body exterior surface, the upper portion of the axial opening forming a cylinder, the body including an integral enlarged diameter external flange at the lower end thereof below said outlet ports, the body having an internal cylindrical shoulder in the axial opening dividing the cylinder from the flow passageway;

an end cap closing the upper end of the body axial opening;

an internal stem guide member removably positioned within said axial opening separating said lower flow passageway and said cylinder, and having a reduced diameter axial opening therein;

a plunger including a valve means reciprocally supported within said flow passageway, the plunger having an upwardly extending axial stem reciprocally and sealably received in said stem guide member axial opening, the plunger having a sealing surface thereon said valve means provides a recess for receiving a portion of said stem guide when the valve means is in the fully open position;

a seating surface within and partially defining said flow passageway, the seating surface being between said inlet port and said lower end outlet port, the valve being closed when said plunger sealing surface engages the seating surface;

a tubular sleeve received in said cylinder of said body axial opening, the lower end of the sleeve engaging said stem guide member and the upper end of said sleeve engaging said end cap whereby said sleeve and stem guide member are held in place between said internal shoulder and said end cap;

a piston reciprocally positioned in said sleeve, the piston being affixed to the upper end of said plunger stem;

a spring compressibly positioned within said sleeve between said piston and said end cap to urge said plunger towards the closed position;

said body having a small diameter passageway communicating between the body exterior and said cylinder above said stem guide means, the small diameter passageway being in part received in said body flange, whereby fluid pressure may be supplied through the small passageway to force said piston and thereby said plunger upwardly to open the valve means; and a tubular valve housing receiving said valve body above said flange, the lower end of said housing being sealably secured to said flange, the internal diameter of the housing being larger than the external diameter of the body above the flange providing an annular flow area communicating with said inlet port, the upper end of the housing having means for attachment to other fluid carrying means.

* * * * *